United States Patent
Duff et al.

(10) Patent No.: US 8,466,919 B1
(45) Date of Patent: Jun. 18, 2013

(54) RE-RENDERING A PORTION OF AN IMAGE

(75) Inventors: Thomas Douglas Selkirk Duff, Berkeley, CA (US); Robert L. Cook, San Anselmo, CA (US)

(73) Assignee: Pixar, Emeryville, CA (US)

( * ) Notice: Subject to any disclaimer, the term of this patent is extended or adjusted under 35 U.S.C. 154(b) by 867 days.

(21) Appl. No.: 12/614,331

(22) Filed: Nov. 6, 2009

(51) Int. Cl.
*G06T 11/20* (2006.01)

(52) U.S. Cl.
USPC .......... 345/440; 345/581; 345/619; 717/104; 717/105; 717/124; 717/125; 717/127; 717/131; 717/144; 717/151

(58) Field of Classification Search
None
See application file for complete search history.

(56) References Cited

U.S. PATENT DOCUMENTS

| | | | |
|---|---|---|---|
| 7,743,353 B2 * | 6/2010 | Baumgartner et al. | 716/106 |
| 7,831,526 B1 * | 11/2010 | Crawford et al. | 706/11 |
| 7,904,892 B2 * | 3/2011 | Babb et al. | 717/144 |
| 8,310,484 B2 * | 11/2012 | Couture-Gagnon et al. | 345/473 |
| 2011/0102441 A1 * | 5/2011 | Rapp et al. | 345/440 |

* cited by examiner

*Primary Examiner* — Antonio A Caschera
(74) *Attorney, Agent, or Firm* — Kilpatrick Townsend & Stockton LLP (57) ABSTRACT

An image may be represented by a directed acyclic graph (DAG) including a number of nodes on paths between input parameters and output values. Intermediate operations are performed at the nodes to produce intermediate output values. One or more of the input parameters may be modified (e.g., by an animator). A determination is then made as to which intermediate output values are affected by the modified input parameters. A simplified DAG is constructed from the nodes corresponding to the intermediate output values affected by the modified input parameters. The intermediate output values that are not affected by the modified input parameters and are maintained at a constant value corresponding to a previously determined value for the intermediate output value. The simplified DAG is evaluated to determine the output resulting from the modified input parameter such that the image may be re-rendered without re-evaluating the full DAG.

28 Claims, 5 Drawing Sheets

RE-RENDERING A PORTION OF AN IMAGE

TECHNICAL FIELD

The present invention relates to computer graphics and animation. More specifically, the present invention relates to evaluating a directed acyclic graph representing an image.

BACKGROUND

The production of animated features involves the use of computer graphics techniques to produce a visually appealing image that can be used to convey an element of a story. One of the challenges in rendering images for use in animated features is balancing the desire for a visually appealing image of a character or object with the practical issues involved in allocating the computational resources required to produce the image in a feature film environment. Further, although the image need not be fully realistic in all cases, it is desirable that the artist producing the image be able to modify certain attributes of the rendered image, typically by adjusting input parameters of the graphics software, to obtain a visually appealing image that suits the purposes of the story line.

In computer animation graphics, a rendering program renders an image by producing pixels from a scene description. Scene description input files contain a three dimensional geometric description of all objects in the scene, as well as a virtual-camera description and light descriptions. In a simple rendering process, an element in the scene or image is modeled and then the software models how that element appears to a viewer (at a specified location and viewing angle) when light (typically multiple light sources) illuminates the element or causes the element to be shaded. A shader program may be associated with each object in the scene and tagged to each light source to compute shading values for the object. Shading values may be related to properties such as color, shadow, smoke, reflections, texture, and the like.

Before executing a shader program, a series of shading points are defined on an object to be shaded. Each shading point is represented as an object with a set of properties. Example properties include the surface normal (N) at the shading point, the light direction, the light color, the light position and texture maps associated with surface coordinates (u, v) to represent, for example, roughness, shininess or other surface characteristics. The shader program operates on these values and produces output values at each shading point. The rendering program collects the outputs on all shading points and then samples them, interpolating as necessary, to populate pixels for an output frame buffer.

An image in a scene may be represented by a directed acyclic graph (DAG) including input parameters and output values. The output values are determined by performing operations on the input parameters. Example operations include calculations (e.g., summation, multiplication and dot product operations) and look-up operations (e.g., referencing a texture map). The operations are depicted in the DAG as nodes on paths between the input parameters and the output values. For example, a look-up operation may be performed using a texture map and surface coordinates (u, v) as input parameters to identify a texture color value. In another example, a surface normal and light direction may be combined using a dot product operation to calculate a light intensity value at the shading point. A multiplication operation may be performed on the light intensity value and a light color value to produce an attenuated light color value. A component multiplication operation may then be performed on the attenuated light color value and the texture color value to calculate a surface color value at the shading point.

During scene creation, an animator may modify different input parameters to generate a visually appealing image. For example, the animator may modify the light color to illuminate the image with a warmer color. In order to observe how the modified light color affects the image, the rendering program determines the new surface color value by re-evaluating the entire DAG. Since the animator may modify many different input parameters and re-render the image hundreds of times before completing the image, re-evaluation of the entire DAG after each input parameter modification drains computational resources and, hence, is costly and inefficient.

Therefore, what is needed is a method for efficiently evaluating a DAG when re-rendering an image.

SUMMARY

Systems and method are provided for re-rendering a portion of an image by efficiently evaluating a directed acyclic graph (DAG) representing the image. In various embodiments, systems and methods are provided for evaluating a simplified DAG that represents a portion of the image affected by a modified input parameter such that only intermediate output values affected by the modified input parameter are evaluated to render the image.

An image may be represented by a DAG including a number of nodes on paths between input parameters and output values. Intermediate calculations and operations are performed at the nodes to produce intermediate output values. One or more of the input parameters may be modified (e.g., by an animator). A determination is then made as to which intermediate output values are affected by the modified input parameter. A simplified DAG is constructed from the nodes corresponding to the intermediate output values affected by the modified input parameter. The intermediate output values that are not affected by the modified input parameter are maintained at a constant value corresponding to a previously determined intermediate output value. The simplified DAG is evaluated to determine the output values resulting from the modified input parameter such that the image may be re-rendered without re-evaluating the full DAG.

In accordance with one aspect of the invention, the present invention is directed to a method for rendering an image. An image rendering process is represented by an initial directed acyclic graph (DAG) comprising a plurality of input parameters, a plurality of intermediate operations and at least one output value. The initial DAG further comprises a plurality of paths between the input parameters and the at least one output value and a plurality of nodes on the paths corresponding to the intermediate operations. An intermediate output value is determined at each node by performing the corresponding intermediate operation. The method includes receiving a selection of an input parameter value to be modified. At least one intermediate output value that is affected by the selected input parameter is identified. A simplified DAG is generated including the intermediate operations corresponding to the identified intermediate output values. Each intermediate output value that is not identified as being affected by the selected input parameter is unchanged. The selected input parameter value is modified. The simplified DAG is evaluated by performing the intermediate operations of the simplified DAG using the modified input parameter value and the unchanged intermediate output values. The evaluated simplified DAG produces an updated value for at least one of the output values. The image is rendered using the updated value of the at least one output value.

In accordance with another aspect of the invention, the present invention is directed to a method for re-rendering a portion of an image. An image rendering process is represented by an initial directed acyclic graph (DAG) comprising a plurality of input parameters, a plurality of intermediate operations and at least one output value. The DAG further comprises a plurality of paths between the input parameters and the at least one output value and a plurality of nodes on the paths corresponding to the intermediate operations. An intermediate output value is determined at each node by evaluating the corresponding intermediate operation. The method includes evaluating the initial DAG and rendering the image using the evaluation of the initial DAG. A selection of an input parameter value to be modified is received. At least one intermediate output value that is affected by the selected input parameter is identified. A simplified DAG is generated including the intermediate operations corresponding to the identified intermediate output values. Each intermediate output value that is not identified as being affected by the selected input parameter is unchanged. The selected input parameter value is modified. The simplified DAG is evaluated by performing the intermediate operations of the simplified DAG using the modified input parameter value and the unchanged intermediate output values. The evaluated simplified DAG produces an updated value for at least one of the output values. The image is re-rendered using the updated value of the at least one output value.

These and other advantages of the invention will be apparent to those of ordinary skill in the art by reference to the following detailed description and the accompanying drawings.

DETAILED DESCRIPTION

An image may be represented by a directed acyclic graph (DAG) including a number of nodes on paths between input parameters and output values. Intermediate operations are performed at the nodes to produce intermediate output values. One or more of the input parameters may be modified (e.g., by an animator). A determination is then made as to which intermediate output values are affected by the modified input parameters. A simplified DAG is constructed from the nodes corresponding to the intermediate output values affected by the modified input parameters. The intermediate output values that are not affected by the modified input parameters and are maintained at a constant value corresponding to a previously determined value for the intermediate output value. The simplified DAG is evaluated to determine the output resulting from the modified input parameter such that the image may be re-rendered without re-evaluating the full DAG.

Figure 1A:
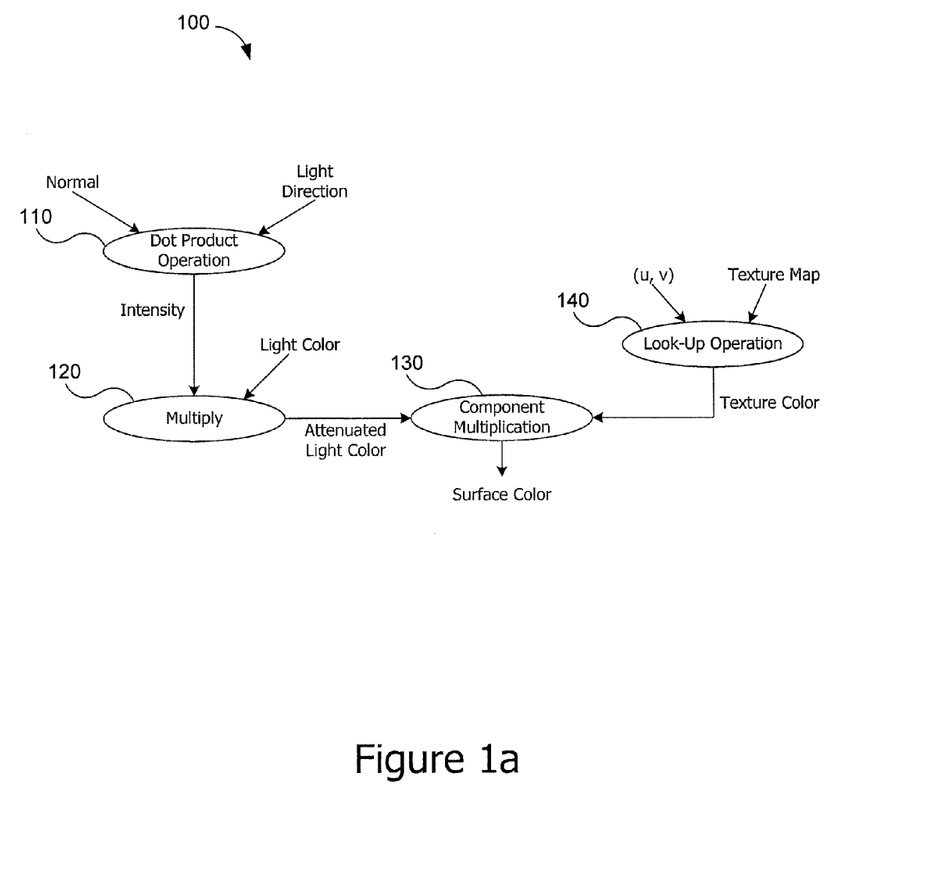
FIGS. 1a-1c illustrate different states of a directed acyclic graph (DAG) when input parameters are modified to re-render a portion of an image according to various embodiments.
Figure 1B:
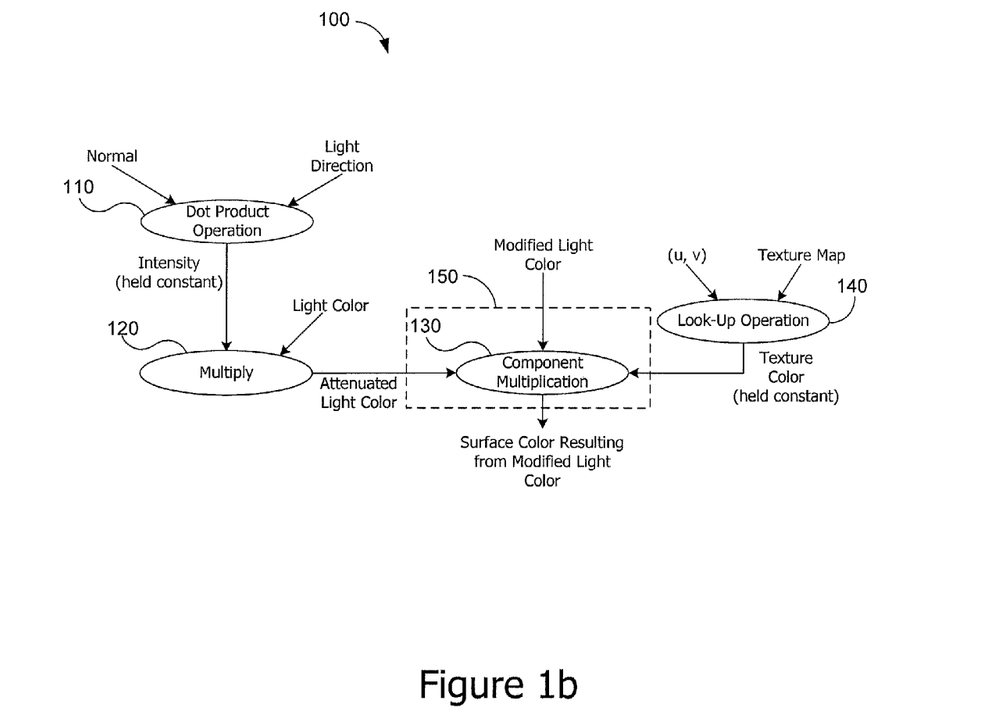
Figure 1C:
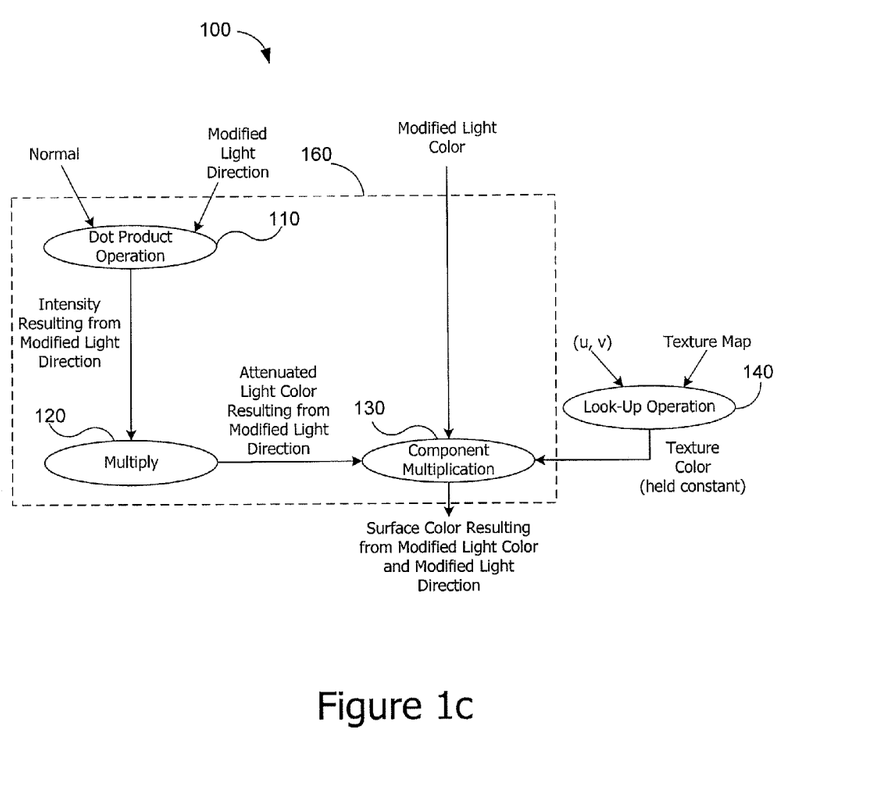

FIGS. 1a-1c illustrate different states of a directed acyclic graph (DAG) 100 when input parameters are modified to re-render a portion of an image according to various embodiments. The DAG 100 represents a rendering program and includes a number of operations performed on input parameters to produce a surface color. Example input parameters include surface normal, light direction, light color, texture map and surface coordinates (u, v) of a shading point. Example operations include calculations such as dot product operation 110, multiplication operations 120, 130 and a look-up operation 140. Other operations may include a summation operation, texture filtering, illumination, shadow calculation and ray tracing. While the present invention is described with reference to a shader program that executes during a rendering process, one having ordinary skill in the art of computer animation graphics would appreciate that the present invention is applicable to any other program executed during the rendering process that could be modeled by a DAG. For example, the present invention may be applicable to programs related to the generation of geometry, the movement of shapes, the use of a texture map on a surface and the modification of the amplitude of bumps.

As shown in FIG. 1a, surface normal and light direction input parameters are combined by dot product operation 110 to calculate a light intensity value, and texture map and surface coordinate (u, v) input parameters are used by look-up operation 140 to generate a texture color value. The light intensity and texture color values are stored in memory for possible use in a subsequent step of the rendering process, as described below. In this example, a light color input parameter is combined with the light intensity value using multiplication operation 120 to produce an attenuated light color value. The attenuated light color value is combined with the texture color value using component multiplication operation 130 to calculate a surface color value. The rendering program would then generate the image using the surface color value at the corresponding shading point.

The animator may observe the surface color and determine that input parameter modification is necessary to produce a more visually appealling image. For example, the animator may modify the light color to be consistent with other images in the scene. After the light color is modified, a determination is made as to which operations of the DAG 100 are affected by the modified input parameter. In other words, a determination is made as to which intermediate output values of the operations 110, 120, 130, 140 are changed in response to the modified input parameter.

As shown in FIG. 1b, component multiplication operation 130 receives as inputs the modified light color, the attenuated light color value from multiplication operation 120 and the texture color value from look-up operation 140. The attenuated light color value and the texture color value are not affected by the modified light color input parameter. Therefore, the stored values for the attenuated light color and the texture color that were determined when the image was previously rendered are used again to re-render the image. In other words, the intermediate output values that are not affected by the modified input parameter are held at a constant value and need not be re-evaluated.

Component multiplication operation 120 is then performed using the modified light color input parameter and the values for the attenuated light color and the texture color that are stored in memory. As a result, a new surface color value is calculated by evaluating only the portion of the DAG 100 affected by the modified light color. The portion of the DAG 100 that is affected by the modified input parameter is referred to as a simplified DAG 150. By evaluating the simplified DAG 150 using the constant values for the intermediate ouptut values that are unaffected by the modified input parameter, less computational resources are required to render the image.

The animator may then observe the new surface color and determine whether additional input parameter modifications are necessary. For example, as shown in FIG. 1c, the animator may modify the light direction. After the light direction is modified, a determination is made as to which operations in the DAG 100 are affected by the modified input parameter. As shown in FIG. 1c, the texture color value output from look-up operation 130 is not affected by the modified light direction input parameter. Therefore, the previous value for the texture color that was calculated when the image was previously rendered is used again when the image is re-rendered.

In accordance with various embodiments, a simplified DAG 160 is constructed to include the operations that produce intermediate output values that are changed in response to the modified input parameter. As shown in FIG. 1c, dot product operation 110 receives as inputs the modified light direction value and a value for the surface normal. Accordingly, dot product operation 110 generates a new value for the light intensity because the light intensity value may be different due to the modified light direction. Since the light intensity value is changed, dot product operation 110 is included in the simplified DAG 160. In addition, multiplication operation 120 receives the modified light direction as an input which results in a changed output value. Thus, multiplication operation 120 is also included in the simplified DAG 160.

The simplified DAG 160 is then evaluated by performing dot product operation 110 on the modified light direction value and a value for the surface normal to generate a new value for the light intensity. Multiplication operation 120 is then performed on the newly calulated light intensity value to produce a new value for the attenuated light color. The previously modified light color and the previously calculated texture color value are retrieved from memory and combined with the new attenuated light color value using component multiplication operation 130. As a result, a new surface color value is generated based on both the previously modified light color and the currently modified light direction.

As described above, the re-rendering process can be expedited by evaluating only the operations of the DAG that are affected by modified input parameters. Previously determined values resulting from intermediate operations in the DAG that are not affected by the modified input parameters are retrieved from memory and used again when evaluating the DAG. Since the entire DAG is not re-evaluated for each re-rendered image when an input parameter is modified, computational resources can be conserved. The more efficient processing in accordance with various embodiments provides computational advantages especially knowing that an animator may re-render an image with modified input parameters more than one hundred times before completing the image.

Figure 2:
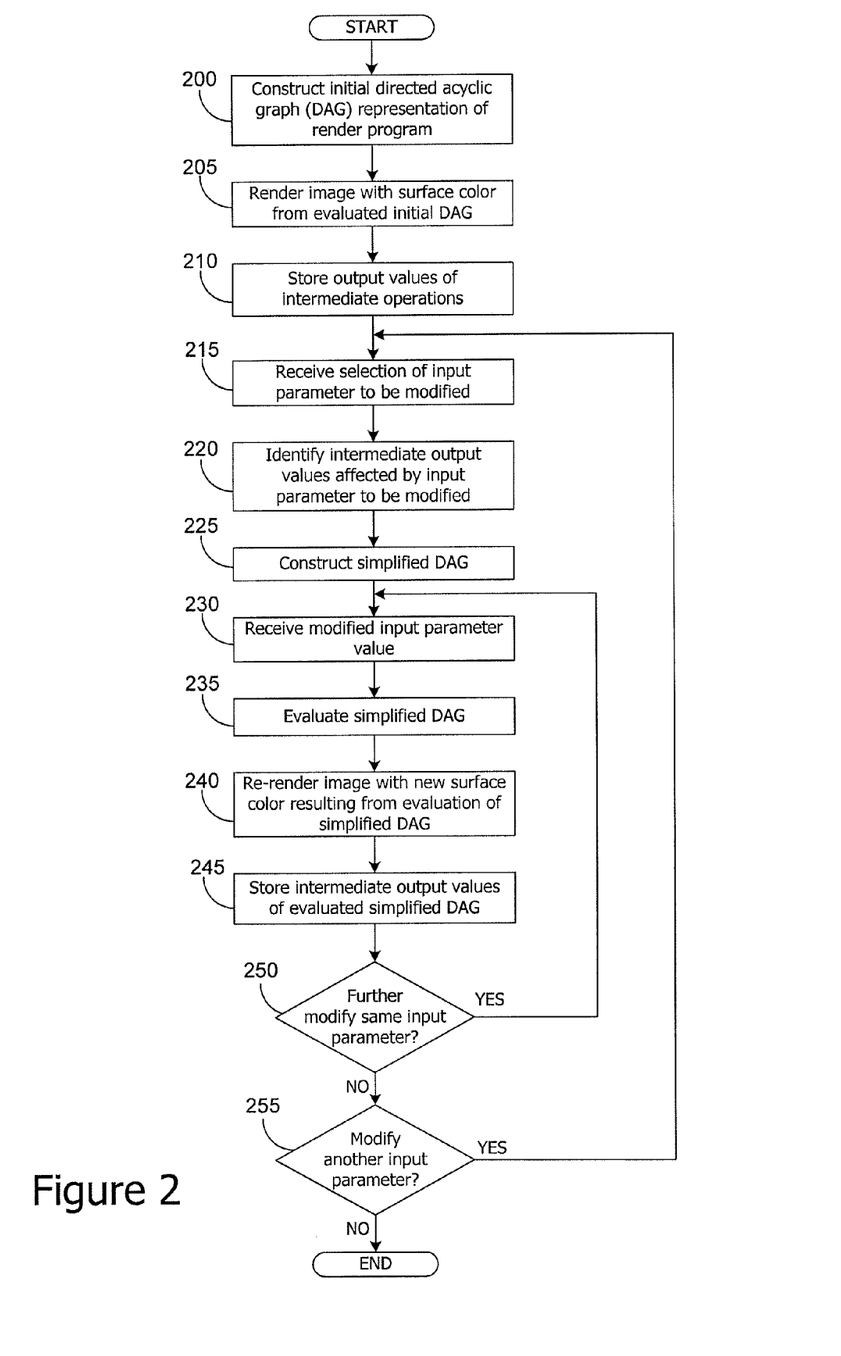
FIG. 2 is a flow diagram illustrating a method for re-rendering a portion of an image according to various embodiments.

FIG. 2 is a flow diagram illustrating a method for re-rendering a portion of an image according to various embodiments. When an animator creates an image for use in a scene of an animated film, the image is rendered and the animator may modify one or more input parameters (e.g., surface texture, lighting, color, etc.) and then render the image again to observe the result. This process is performed repeatedly until the desired image is created. The method for re-rendering a portion of an image described below expedites the rendering process.

An initial directed acyclic graph (DAG) that represents operations associated with a render program is constructed (step 200). The DAG includes a number of input parameters, a number of output values, and a number of pathways between the input parameters and the output values. Intermediate operations are performed at nodes on the pathways to produce intermediate output values. Example intermediate operations include calculations (e.g., a dot product operation) and look-up operations (e.g., referencing a texture map).

In some embodiments, the rendering program includes a process that is reiterated a number of times, commonly referred to as a "loop" or a "nested loop". In some cases, the loop may be iterated a predetermined number of times. In other cases, the number of times that the loop is iterated is dependent on a condition such that the number of times that the loop is iterated is arbitrarily large. In many cases, the number of times that the loop is executed is not known until the loop is actually executed due to the dependency on the condition. In other words, the loop is executed a number of times until a threshold of the condition is reached.

The presence of a loop in the rendering program may be handled in different ways when constructing the initial DAG. In one embodiment, the loop is modeled in the DAG as one node. In another embodiment, the initial DAG is constructed as the loop is executed to include a node for each iteration or individual step of the loop. In still another embodiment, the initial DAG is constructed to include a specific number of nodes. However, if the condition is such that the actual number of times that the loop is executed exceeds the specific number of nodes, the initial DAG is constructed to model the loop as one node.

The image is rendered with a surface color from the evaluated initial DAG (step 205). The DAG is evaluated by performing the intermediate operations using the input parameter values to produce the output value for the surface color. It is understood that several different intermediate operations may be performed on different input parameter values and intermediate output values before evaluation of the DAG is complete.

The intermediate output values corresponding to the results of the intermediate operations of the DAG are stored in memory (step 210). Some of the intermediate output values may be subsequently retrieved from memory to evaluate a simplified version of the DAG, as described below.

A selection of an input parameter to be modified is received (step 215). The input parameter to be modified may be selected by an animator during scene creation. The intermediate output values that are affected by the selected input parameter to be modified are identified (step 220). An intermediate output value is said to be affected by the input parameter to be modified when the intermediate output value changes in response to the modified input parameter. Any intermediate output values that are not affected by the input parameter to be modified are maintained at the previously determined values stored in memory. By identifying the intermediate output values of the DAG that are not affected by the input parameter to be modified, the entire DAG need not be evaluated each time an input parameter value is modified. Rather, a simplified DAG is evaluated that does not include the intermediate operations that are unaffected by the modified input parameter value.

The simplified DAG is constructed (step 225). The simplified DAG is constructed to include the intermediate operations affected by the input parameter to be modifies and the stored intermediate output values for results of the intermediate operations not affected by the input parameter to be modified.

The modified input parameter value is received (step 230). Any of the input parameter values may be modified including, for example, texture, lighting and color parameters. Some modified input parameter values cause other parameter values to be modified even though the other parameter values were not directly modified. For example, the animator may move a light direction which causes a shadow map associated with the light to be re-evaluated.

The simplified DAG is evaluated by performing the intermediate operations affected by the modified input parameter value and using the stored intermediate output values as results for the intermediate operations not affected by the modified input parameter value (step 235). In other words, the simplified DAG is evaluated without determining the intermediate output values for the intermediate operations unaffected by the modified input parameter value. Thus, the least amount of data is analyzed to re-evaluate the DAG in order to render an image resulting from the modified input parameter.

The image is re-rendered with a new surface color resulting from evaluation of the simplified DAG due to the modified input parameter value (step 240). The re-rendered image is substantially identical to the previously rendered image except for the portion of the image affected by the modified input parameter value.

The intermediate output values from the evaluation of the simplified DAG are stored in memory (step 245). These values may be used in a subsequent process of re-rendering the image if the corresponding intermediate operations are not affected by subsequently modified input parameters.

A determination is made whether the animator wants to modify the same input parameter again (step 250). The animator may re-modify the input parameter because she is still not satisfied with how the input paranetrer affects the visual appearance of the rendered image. If the animator wants to re-modify the input parameter, processing returns to step 230. Otherwise, processing is continues to step 255.

A determination is made whether the animator wants to modify another input parameter (step 255). The animator may modify another input parameter because she is not satisfied with the visual appearance of the rendered image. If the animator wants to modify another input parameter, processing returns to step 215. Otherwise, processing is terminated.

Figure 3:
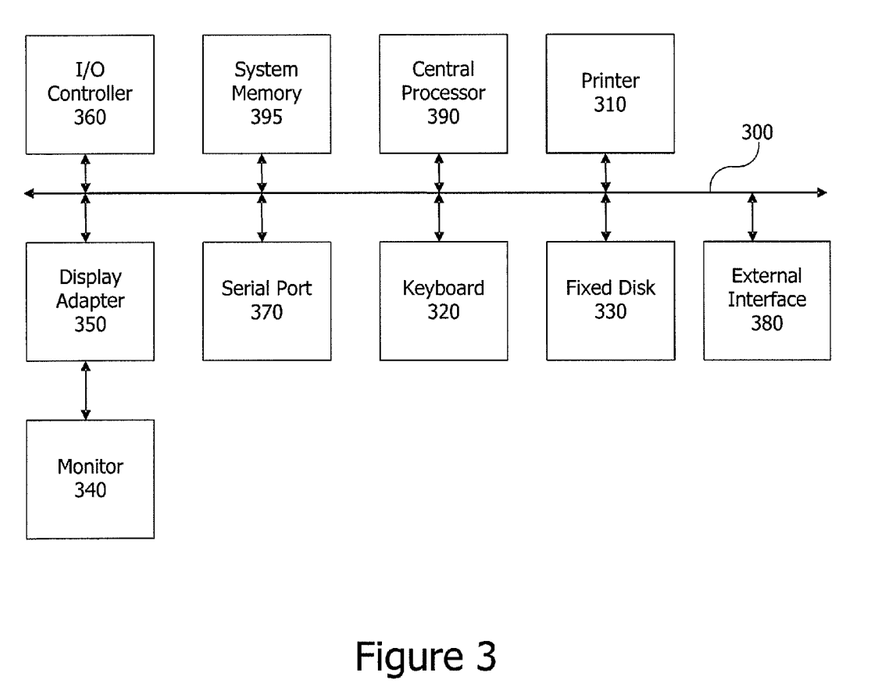
FIG. 3 shows an exemplary block diagram of some elements that may be present in a computer device configured to execute a program that re-renders a portion of a image according to various embodiments.

FIG. 3 shows an exemplary block diagram of some elements that may be present in a computer device configured to execute a rendering program that re-renders a portion of an image according to embodiments of the invention. The subsystems shown in FIG. 3 are interconnected via a system bus 300. Additional subsystems such as a printer 310, a keyboard 320, a fixed disk 330, a monitor 340, which is coupled to a display adapter 350, and others are shown. Peripherals and input/output (I/O) devices, which couple to an I/O controller 360, can be connected to the computer system by any number of means known in the art, such as a serial port 370. For example, the serial port 370 or an external interface 380 can be used to connect the computer apparatus to a wide area network such as the Internet, a mouse input device, or a scanner. The interconnection via the system bus 300 allows a central processor 390 to communicate with each subsystem and to control the execution of instructions from a system memory 395 or the fixed disk 330, as well as the exchange of information between subsystems. The system memory 395 and/or the fixed disk 330 may embody a computer readable medium storing code modules, which when executed by a processor or processors, implement embodiments as described above.

As is apparent from the above description, a method for re-rendering a portion of an image in accordance with embodiments of the present invention evaluates only the portion of a DAG affected by a modified input parameter. Portions of an image may be re-rendered using previously determined intermediate output values that are not affected by the modified input parameter. Holding constant the unaffected intermediate output vlaues expedites the re-rendering process and reduces the consumption of computational resources. Re-rendering less than the entire image provides an animator with immediate feedback such that the surface color resulting of the modified input parameter may be quickly observed from the re-rendered image. Thus, the animator may expeditiously create a desired image without re-rendering the full image each time an input parameter is modified.

The present invention has been described in terms of specific embodiments. As will be understood by those skilled in the art, the embodiments illustrated above may be modified, altered, and changed without departing from the scope of the present invention. The scope of the present invention is defined by the appended claims.

What is claimed is:

1. A method for rendering an image, wherein an image rendering process is represented by an initial directed acyclic graph (DAG) comprising a plurality of input parameters, a plurality of intermediate operations and at least one output value, the initial DAG further comprising a plurality of paths between the input parameters and the at least one output value and a plurality of nodes on the paths corresponding to the intermediate operations, wherein an intermediate output value is determined at each node in the plurality of nodes by performing the corresponding intermediate operation, the method comprising:
   receiving, at one or more computer systems, information modifying at least one input parameter in the plurality of input parameters;
   identifying, with one or more processors associated with the one or more computer systems, at least one intermediate output value at least one node in the plurality of nodes that is affected by the modified at least one input parameter in the plurality of input parameters;
   generating, with the one or more processors associated with the one or more computer systems, a simplified DAG comprising the intermediate operations corresponding to the identified at least one intermediate output value at the at least one node in the plurality of nodes of the initial DAG, wherein each intermediate output value at a node in the simplified DAG that is not identified as being affected by the selected modified at least one input parameter in the plurality of input parameters in the initial DAG is unchanged in the simplified DAG;
   evaluating, with the one or more processors associated with the one or more computer systems, the simplified DAG by performing the intermediate operations of the simplified DAG using the modified at least one input parameter in the plurality of input parameters, wherein the evaluated simplified DAG produces an updated value for at least the at least one output value; and
   rendering, with the one or more processors associated with the one or more computer systems, the image using the updated value of the at least one output value.

2. The method of claim 1, wherein intermediate output values determined to be unchanged in the simplified DAG correspond to previously determined values of the initial DAG.

3. The method of claim 1, wherein rendering the image comprises executing a shader program.

4. The method of claim 1, wherein the intermediate operations include at least one of calculations and look-up operations.

5. The method of claim 1, wherein the updated value for the at least one output value corresponds to a surface color.

6. The method of claim 1, wherein the modified at least one input parameter in the plurality of input parameters comprises one of a surface normal, a light position, a light direction, a light color, a light intensity, a texture map or surface coordinates of a shading point.

7. The method of claim 1, further comprising:
evaluating the initial DAG before evaluating the simplified DAG;
storing the intermediate output values resulting from the evaluation of the initial DAG in memory; and
rendering the image using the evaluation of the initial DAG.

8. The method of claim 7, further comprising:
retrieving one or more of the intermediate output values that are not identified as being affected by the modified at least one input parameter in the plurality of input parameters from the memory, wherein at least some of the retrieved intermediate output values correspond to a constant value.

9. The method of claim 7, wherein evaluating the initial DAG comprises performing the intermediate operations using the plurality of input parameters to determine the at least one output value.

10. The method of claim 1, further comprising:
storing the intermediate output values resulting from the evaluation of the simplified DAG and the updated value of the at least one output value in memory.

11. The method of claim 1, further comprising:
before generating the simplified DAG, modifying the initial DAG in response to receiving a modification to a value of one of the plurality of input parameters.

12. A method for re-rendering a portion of an image, wherein an image rendering process is represented by an initial directed acyclic graph (DAG) comprising a plurality of input parameters, a plurality of intermediate operations and at least one output value, the initial DAG further comprising a plurality of paths between the input parameters and the at least one output value and a plurality of nodes on the paths corresponding to the intermediate operations, wherein an intermediate output value is determined at each node in the plurality of nodes by performing the corresponding intermediate operation, the method comprising:
evaluating, with one or more processors associated with one or more computer systems, the initial DAG;
rendering, with the one or more processors associated with the one or more computer systems, the image using the evaluation of the initial DAG;
receiving, with at the one or more computer systems, information modifying at least one input parameter in the plurality of input parameters;
identifying, with the one or more processors associated with the one or more computer systems, at least one intermediate output value at at least one node in the plurality of nodes that is affected by the modified at least one input parameter in the plurality of input parameters;
generating, with the one or more processors associated with the one or more computer systems, a simplified DAG comprising the intermediate operations corresponding to the identified at least one intermediate output value at the at least one node in the plurality of nodes of the initial DAG, wherein each intermediate output value at a node in the simplified DAG that is not identified as being affected by the modified at least one input parameter in the plurality of input parameters in the initial DAG is unchanged in the simplified DAG;
evaluating, with the one or more processors associated with the one or more computer systems, the simplified DAG by performing the intermediate operations of the simplified DAG using the modified at least one input parameter in the plurality of input parameters, wherein the evaluated simplified DAG produces an updated value for at least the at least one output value; and
re-rendering, with the one or more processors associated with the one or more computer systems, the image using the updated value of the at least one output value.

13. The method of claim 12, wherein intermediate output values determined to be unchanged in the simplified DAG correspond to previously determined values of the initial DAG.

14. The method of claim 12, wherein rendering the image comprises executing a shader program.

15. The method of claim 12, wherein the intermediate operations include at least one of calculations and look-up operations.

16. The method of claim 12, wherein the at least one output value corresponds to a surface color.

17. The method of claim 12, wherein the modified at least one input parameter in the plurality of input parameters comprises one of a surface normal, a light position, a light direction, a light color, a light intensity, a texture map or surface coordinates of a shading point.

18. The method of claim 12, further comprising:
storing the intermediate output values resulting from the evaluation of the initial DAG in memory.

19. The method of claim 18, further comprising:
retrieving one or more of the intermediate output values that are not identified as being affected by the modified at least one input parameter in the plurality of input parameters from the memory, wherein at least some of the retrieved intermediate output values correspond to a constant value.

20. The method of claim 18, wherein evaluating the initial DAG comprises performing the intermediate operations using the plurality of input parameters to determine the at least one output value.

21. The method of claim 12, further comprising:
storing the intermediate output values resulting from the evaluation of the simplified DAG and the updated value of the at least one of the output values in memory.

22. The method of claim 12, wherein the image rendering process includes a loop that is iterated a number of times, the method further comprising:
before generating the simplified DAG, modeling the loop as one node of the initial DAG.

23. The method of claim 12, wherein the image rendering process includes a loop that is iterated a number of times, the method further comprising:
before generating the simplified DAG, modeling each iteration of the loop as one node of the initial DAG.

24. The method of claim 23, wherein the initial DAG is generated during execution of the loop.

25. A non-transitory computer readable medium storing a set of code modules which when executed by a processor of a computer system cause the processor to render an image, wherein an image rendering process is represented by a directed acyclic graph (DAG) comprising a plurality of input parameters, a plurality of intermediate operations and at least one output value, the initial DAG further comprising a plurality of paths between the input parameters and the at least one output value and a plurality of nodes on the paths corresponding to the intermediate operations, wherein an intermediate output value is determined at each node in the plurality of nodes by performing the corresponding intermediate operation, the non-transitory computer-readable medium comprising:

code for receiving information modifying at least one input parameter in the plurality of input parameters;

code for identifying at least one intermediate output value at at least one node in the plurality of nodes that is affected by the modified at least one input parameter in the plurality of input parameters;

code for generating a simplified DAG comprising the intermediate operations corresponding to the identified at least one intermediate output value at the at least one node in the plurality of nodes of the initial DAG, wherein each intermediate output value at a node in the simplified DAG that is not identified as being affected by the modified at least one input parameter in the plurality of input parameters in the initial DAG is unchanged in the simplified DAG;

code for evaluating the simplified DAG by performing the intermediate operations of the simplified DAG using the modified at least one input parameter in the plurality of input parameters, wherein the evaluated simplified DAG produces an updated value for at least the at least one output value; and code for rendering the image using the updated value of the at least one output value.

26. The non-transitory computer-readable medium of claim 25, further comprising:

code for evaluating the initial DAG before evaluating the simplified DAG;

code for storing the intermediate output values resulting from the evaluation of the initial DAG in memory; and code for rendering the image using the evaluation of the initial DAG.

27. The non-transitory computer-readable medium of claim 25, further comprising:

code for retrieving one or more of the intermediate output values that are not identified as being affected by the modified at least one input parameter in the plurality of input parameters from the memory, wherein at least some of the retrieved intermediate output values correspond to a constant value.

28. The non-transitory computer-readable medium of claim 25, further comprising:

code for storing the intermediate output values resulting from the evaluation of the simplified DAG and the updated value of the at least the output values in memory.

\* \* \* \* \*

UNITED STATES PATENT AND TRADEMARK OFFICE
CERTIFICATE OF CORRECTION

PATENT NO. : 8,466,919 B1  
APPLICATION NO. : 12/614331  
DATED : June 18, 2013  
INVENTOR(S) : Thomas Douglas Selkirk Duff and Robert L. Cook It is certified that error appears in the above-identified patent and that said Letters Patent is hereby corrected as shown below:

In the Claims Section,

Column 8, line 32: insert --at-- as shown
"...intermitiare output value at at least one node..."

Column 8, line 42: delete "selected" as shown
"...affected by the selected modified at least one..."

Column 12, line 21: insert --one-- and delete "the" as shown
"...at least one the output values in memory."

Signed and Sealed this
Tenth Day of September, 2013

Teresa Stanek Rea
*Acting Director of the United States Patent and Trademark Office*